(12) United States Patent
Imai (10) Patent No.: US 8,537,391 B2
(45) Date of Patent: Sep. 17, 2013

(54) IMAGE FORMING APPARATUS, METHOD OF CONTROLLING THE SAME AND PROGRAM OF THE SAME

(75) Inventor: Hitoshi Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 12/756,180

(22) Filed: Apr. 8, 2010

(65) Prior Publication Data

US 2010/0265543 A1  Oct. 21, 2010

(30) Foreign Application Priority Data

Apr. 15, 2009 (JP) ................................. 2009-099046

(51) Int. Cl.
*G06F 15/00* (2006.01)

(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS

2006/0001901 A1* 1/2006 Kidani et al. ................ 358/1.14

FOREIGN PATENT DOCUMENTS

JP 2004-001320 A 1/2004

* cited by examiner

*Primary Examiner* — Saeid Ebrahimi Dehkordy (74) *Attorney, Agent, or Firm* — Fitzpatrick, Cella, Harper & Scinto (57) ABSTRACT

An image forming apparatus comprises a reception unit configured to receive the print job from the external apparatus, a unit configured to spool the received print job, a development unit configured to develop the spooled print job to a printable data, a unit configured to detect network disruption in the network, and a control unit configured to, in a case of detecting the network disruption in the middle of spooling and developing the received print job, stop the development of the print job for a stop state and set a subsequent print job which is not in the stop state as an object of the development.

5 Claims, 12 Drawing Sheets

IMAGE FORMING APPARATUS, METHOD OF CONTROLLING THE SAME AND PROGRAM OF THE SAME

BACKGROUND OF THE INVENTION

1. Field of the Invention

The present invention relates to a process of automatically changing the process order of a plurality of print jobs in response to a situation in an image forming apparatus which can simultaneously receive the print jobs outputted from an external apparatus, for further improving an operating efficiency.

2. Description of the Related Art

Recently there has spread a printing system provided with an image forming apparatus which receives print jobs inputted via a network from an external apparatus such as a personal computer (PC) and executes the output process, and there has been increasing an image forming apparatus which can receive a plurality of print jobs even if the print jobs are simultaneously inputted thereto. There is a problem that in a situation where a plurality of print jobs are inputted to such an image forming apparatus, when the output process is stopped due to occurrence of errors in the middle of output-processing a precedent print job, the output process of the subsequent print job is also stopped. As a method of solving this problem, there is an image forming apparatus provided with a job promoting function (passing printing) in which when an error occurs in the middle of output-processing one print job, the output process is stopped and the subsequent print job is processed to be outputted before the precedent print job (for example, refer to Japanese Patent Laid-Open No. 2004-001320). In the image forming apparatus provided with this job promoting function, in a stage where the error is cleared, the output process of the stopped print job is resumed.

Under such a situation, a wireless network has become widespread. As well known, a wireless communication quality is susceptible to an environment and the network disruption (communication error) tends to occur more easily than a wired network. In addition, in a case where the network disruption occurs in the wireless network, the communication environment itself frequently causes the network disruption and therefore, occurrence of the network disruption is frequently repeated.

Figure 9:
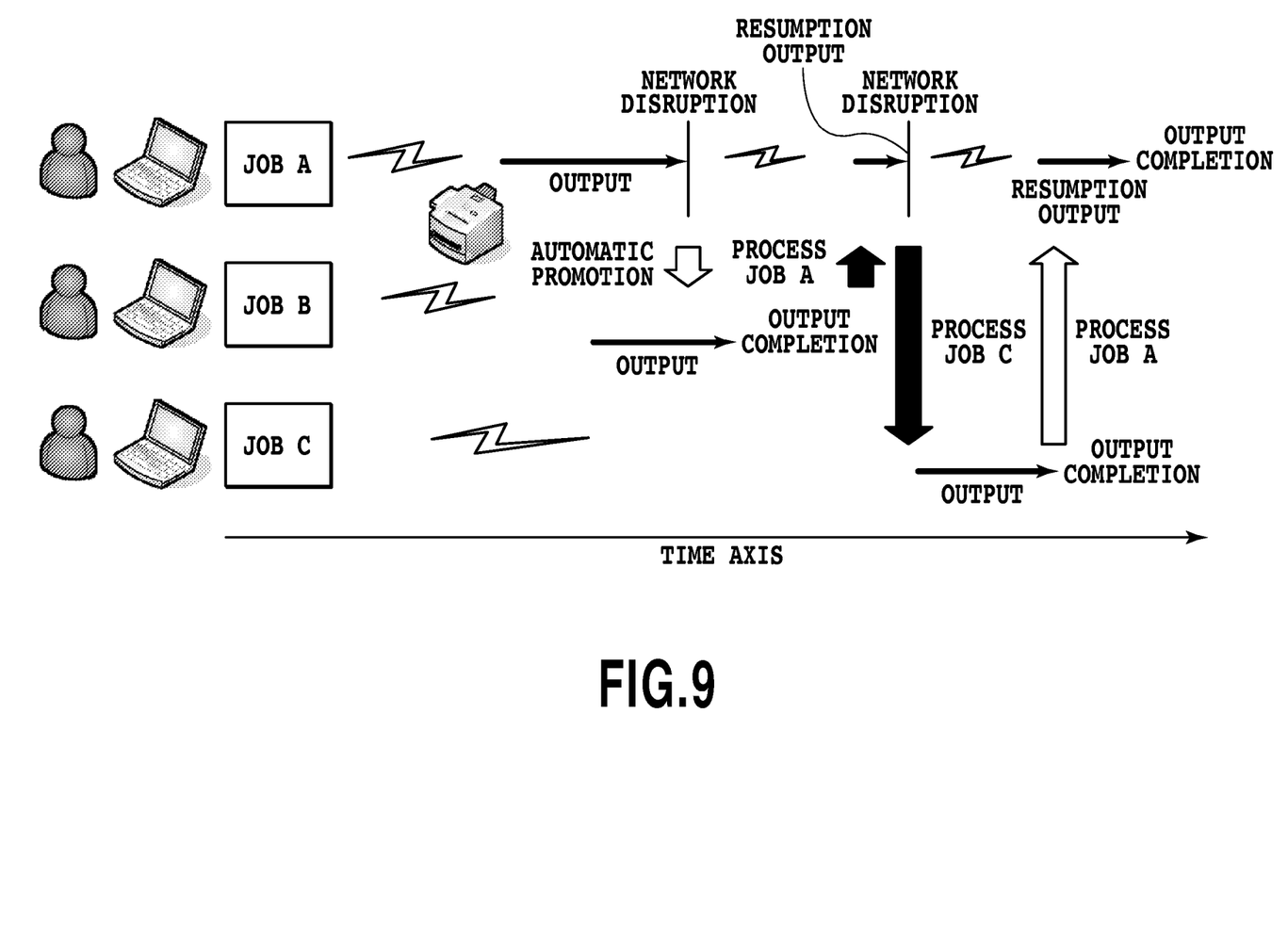
FIG. 9 is an image diagram showing processing in a case where the conventional technology is applied to a printing system of inputting a print job from an external apparatus by using a wireless network.

FIG. 9 is an image diagram showing the process in a case where the job promoting function as disclosed in Japanese Patent Laid-Open No. 2004-001320 is applied to a printing system for inputting a print job from an external apparatus by using a wireless network.

On the assumption that a job A, a job B and a job C are inputted to a printer in that order from each PC, a rough flow of the process will be explained. First, the printer starts with the output process of the job A first inputted. Before the output process of the job A is completed, the session is disconnected due to the network disruption, and therefore, the printer is automatically promoted to the job B and starts the output process of the job B. When the network of the job A is reconnected (communication is recovered) at a point where the output process of the job B is completed, the printer is not automatically promoted to the output process of the job C and resumes (resumes output of) the development process to the printing process of the precedent job A. When the session disconnection again occurs due to the network disruption before the development process to the printing process of the job A are completed, the printer is automatically promoted to the job C and starts the output process of the job C. After the output process of the job C is completed, the development process to the printing process of the job A is again resumed at a point where the network of the job A is reconnected.

In a case of thus using the wireless network, particularly when the communication is intermittently disconnected or recovered, the automatic promotion tends to easily occur at each time thereof.

In addition, when the automatic promotion frequently occurs, many hours are spent by the time the output processes of all the print jobs are completed, and there occurs an event of keeping a plurality of users waiting for completion of the printing output for a long time.

SUMMARY OF THE INVENTION

An image forming apparatus according to the present invention is provided with an image forming apparatus to which an external apparatus equipped with a transmission unit of a print job is connected via a network, the apparatus comprising a reception unit configured to receive the print job from the external apparatus, a unit configured to spool the received print job, a development unit configured to develop the spooled print job to a printable data, a unit configured to detect network disruption in the network, and a control unit configured to, in a case of detecting the network disruption in the middle of spooling and developing the received print job, stop the development of the print job for a stop state and set a subsequent print job which is not in the stop state as an object of the development, wherein the spooling unit resumes the spool of the print job when the network of the print job in the stop state is reconnected, and the control unit releases the stop state of the print job when the spool of the print job in the stop state is completed.

In the job promotion when the network disruption and the network reconnection occur, it is possible to carry out an efficient job promotion of a plurality of print jobs, reducing an output waiting time of a user.

Further features of the present invention will become apparent from the following description of exemplary embodiments with reference to the attached drawings.

DESCRIPTION OF THE EMBODIMENTS

Hereinafter, the best mode of carrying out the present invention will be explained with reference to the drawings.

First Embodiment

Figure 1:
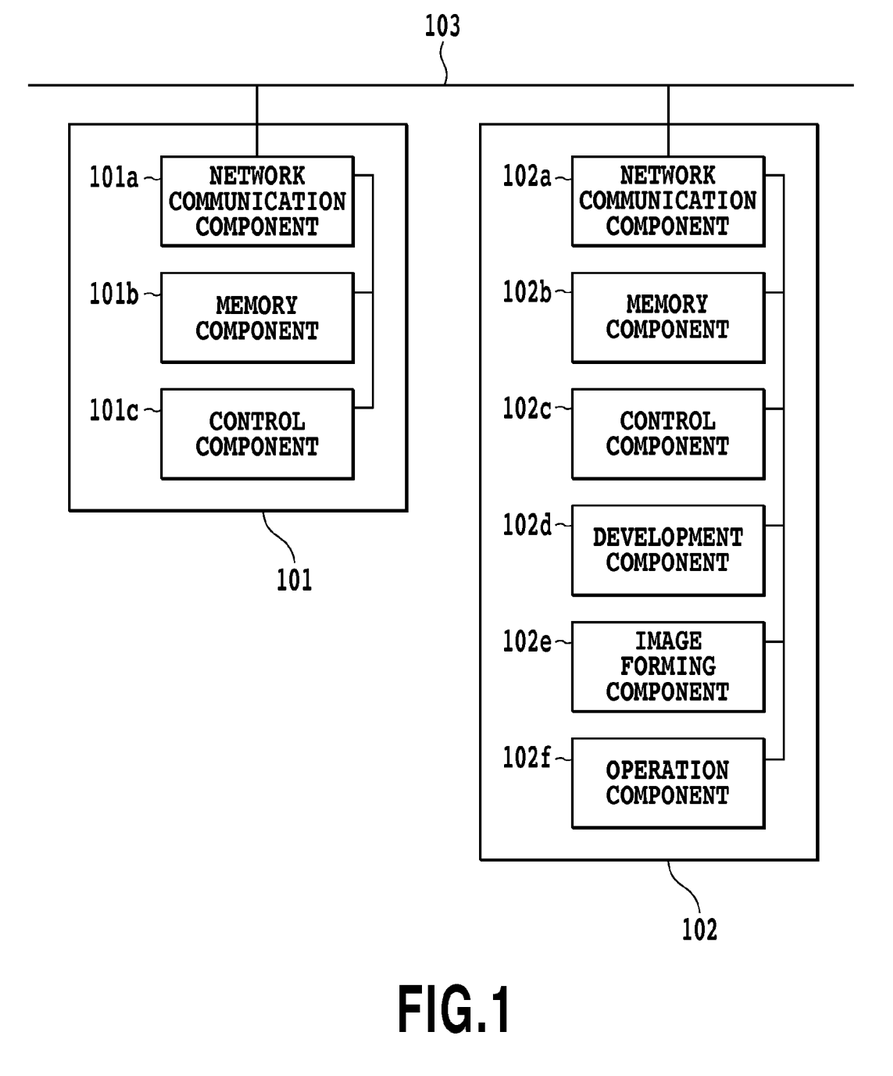
FIG. 1 is a system arrangement diagram showing an example of an entire arrangement of a printing system showing an embodiment of the present invention.

FIG. 1 is a system arrangement diagram showing an example of an entire arrangement of a printing system showing an embodiment of the present invention.

As shown in FIG. 1, in the printing system of the present embodiment, an external apparatus 101 represented by a disc top PC, a note PC, a mobile information terminal or the like and an image forming apparatus 102 such as MFP are connected through a network 103. The external apparatus 101 and the image forming apparatus 102 may be directly connected by a wired LAN or wireless LAN or may be connected through the Internet.

The external apparatus 101 comprises CPU, ROM, RAM, HDD and the like, where CPU reads out and executes programs stored in HDD on RAM to realize a function of each component. A network communication component 101a performs transmission and reception of data to the image forming apparatus 102. In addition, the network communication component 101a also performs detection of session disconnection due to the network disruption. A memory component 101b comprises ROM, RAM, HDD and the like and stores print data and the like therein. A control component 101c executes various types of control processes by control programs executed by CPU. The control component 101c generates a print job from a document produced by a user using a printing application. Here, the print job comprises job session information, print settings and PDL data. It should be noted that in the present specification, an expression of "print data" means a state formed by removing the job session information from the print job (print setting+PDL data). The control component 101c is configured to store the print job in the memory component 101b and read out the print job from the memory component 101b for transmitting the print job via the network communication component 101a to the image forming apparatus 102. In addition, the control component 101c receives data via the network communication component 101a from the image forming apparatus 102 and controls the print job based upon the received content.

The image forming apparatus 102 comprises CPU, ROM, RAM, HDD and the like, where CPU reads out and executes programs stored in HDD on RAM to realize a function of each component.

A network communication component 102a performs transmission and reception of data to the external apparatus 101. In addition, the network communication component 102a also performs detection of session disconnection due to the network disruption. A memory component 102b is realized by ROM, RAM, HDD and the like and stores print jobs and the like therein. When a control component 102c receives a print job via the network communication component 102a, the control component 102c allots a region for the print job based upon job session information in the print job and stores a print setting and a print data in a memory component 102b. The control component 103c is operable to develop a PDL data in the print job to a printable image data in a development component 102d and form an image (that is, execute a printing process) on a print sheet in accordance with the print setting in an image forming component 102e. In this way, the control component 102c controls the process of each arrangement component for the printing process. An operation component 102f is a user interface which displays a state of the print job (receiving, print waiting, printing, print completion or the like) or receives a user instruction for the print job. Examples of the user instruction include an explicit stop of the print job and cancellation of the print job, and a control component 103b executes control in response to an input signal according to an instruction of the user.

Figure 8:
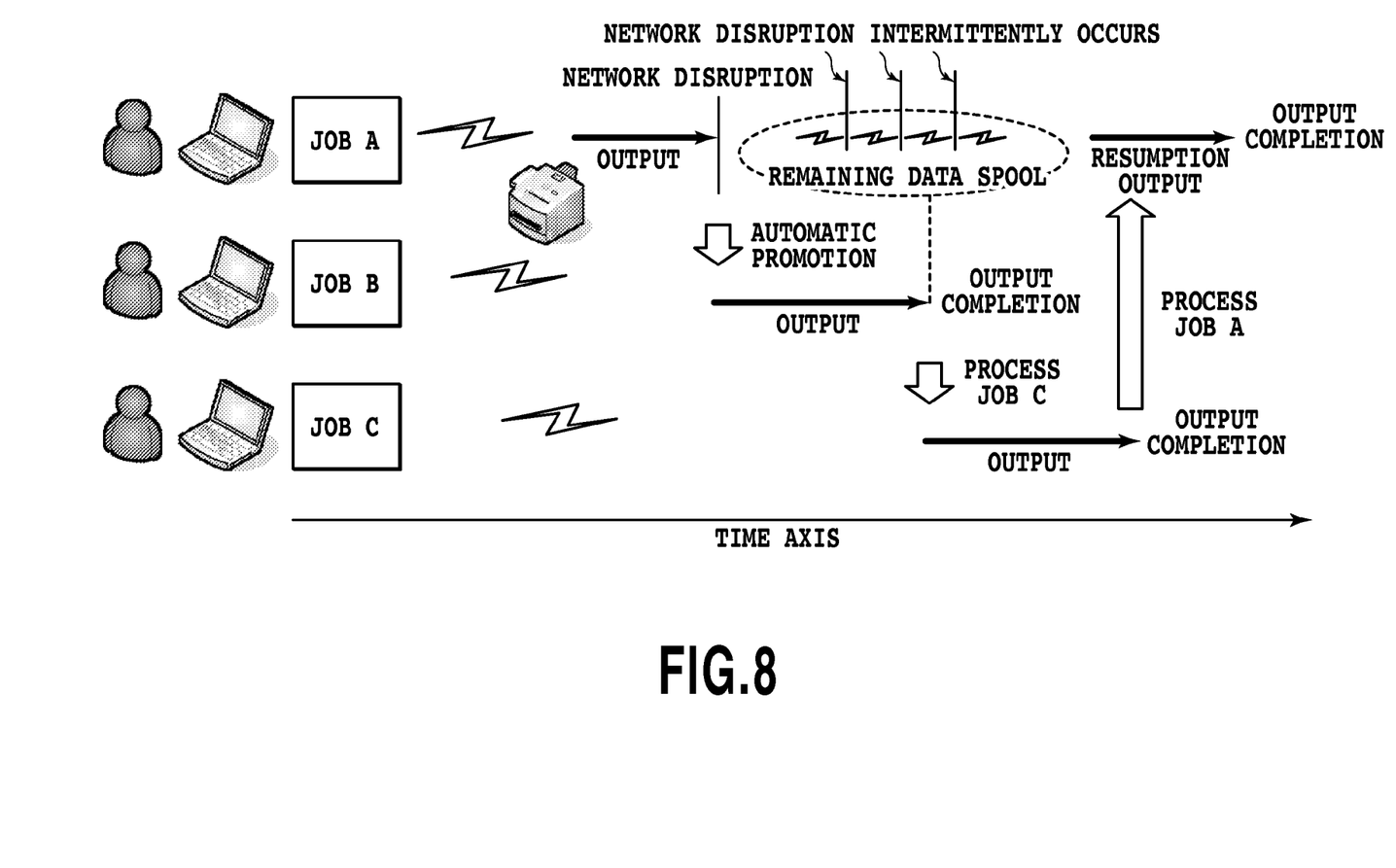
FIG. 8 is an image diagram showing processing in a case where the present invention is applied to a printing system of inputting a print job from the external apparatus by using a wireless network.

FIG. 8 is an image diagram showing a state where the print job is processed by the printing system according to the present embodiment.

A flow of the rough process in a state where a job A, a job B and a job C are inputted to the printer in that order from each PC. First, the printer starts with the output (drawing or printing) process of the first inputted job A. Since the session is disconnected due to the network disruption before the output process of the job A is completed, the printer is automatically promoted to the job B and starts the output process of the job B. At a point where the output process of the job B is completed, the network of the job A is reconnected. However, since the session is disconnected due to intermittent network disruption, a spool process of the remaining data is not completed. Therefore, the printer gives priority to the output process of the job C to be automatically promoted to the job C. When the spool process is completed at a point where the output process of the job C is completed, the printer resumes (resumes output of) the development process to the printing process of the job A.

According to the present invention, the print job is scheduled as described above.

Figure 2:
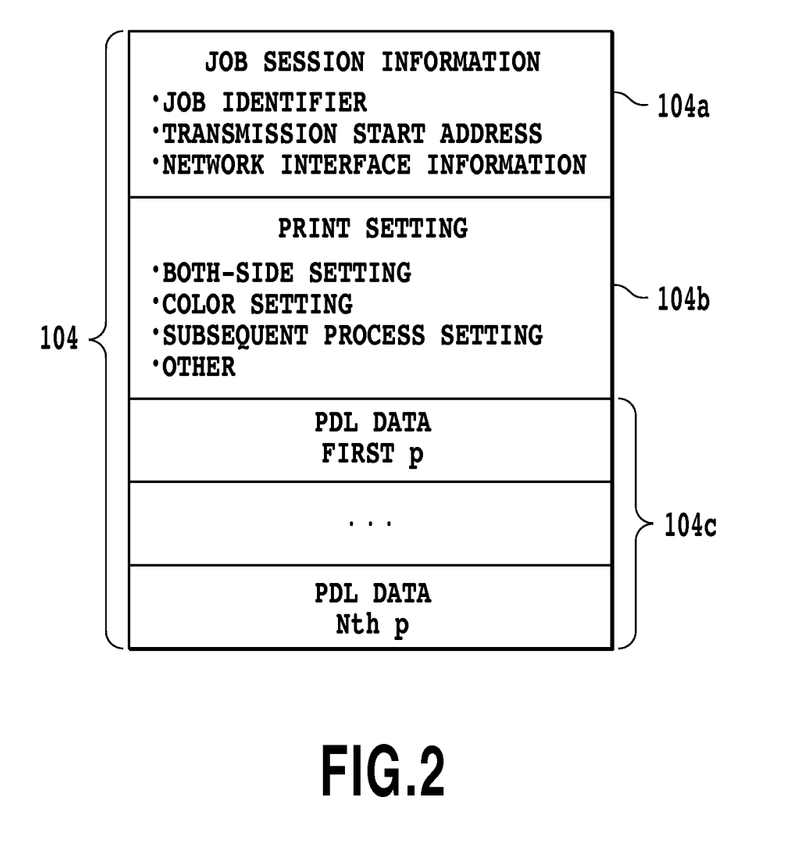
FIG. 2 is a diagram conceptually showing a structure of a print job inputted in an image forming apparatus from an external apparatus.

FIG. 2 is a diagram conceptually showing a structure of a print job 104 inputted (transmitted) to the image forming apparatus from the external apparatus.

Job session information 104a contains a job identifier as an identifier of a print job, a transmission start address and network interface information. The job identifier is specific to each print job and is generated in the control component 101c of the external apparatus 101. The transmission start address is an address showing that the transmission is started from what bite number of PDL data. The control component 102c of the image forming apparatus 102 reads out the transmission start address and thereby can recognize that the PDL data of what bite number is transmitted from the external apparatus 101. The network interface information is information showing whether a network interface used in the external apparatus is wireless or wired.

A print setting 104b is a portion of the information designating how the printing is carried out, and sets, for example, contents such as single-side/both-side printing, a color mode (black-and-white printing or color printing) and a subsequent process (staple, punch or the like). Besides, the print setting 104b can contain information in regard to the process content, for example, either the print job includes execution of the printing process or stays in the drawing process. A PDL data 104c is a data acquired by PDL (Page Description Language)-converting a document produced by a user using a printing application in the control component 101c of the external apparatus 101. A development component 102d in the image forming apparatus 102 develops the PDL data 104c to a printable image data (raster data).

Figure 7:
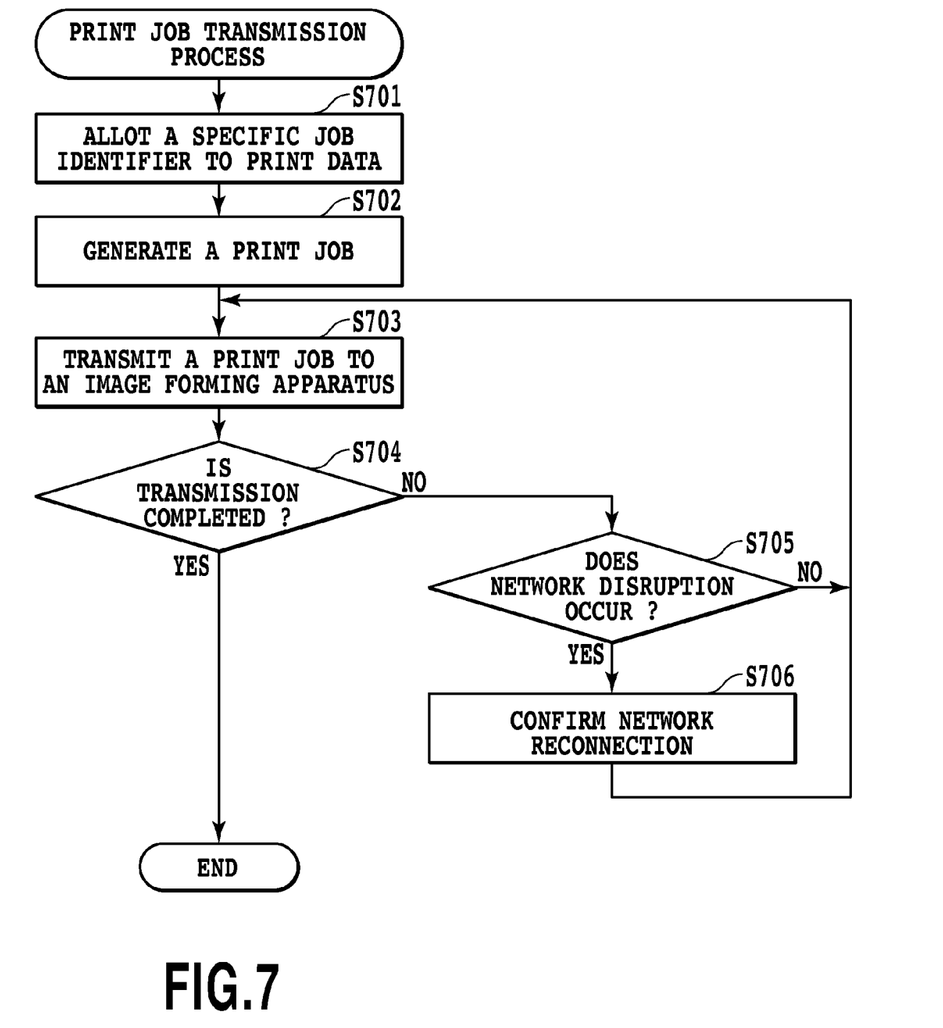
FIG. 7 is a flow chart showing a transmission process of a print job by an external apparatus.

FIG. 7 is a flow chart showing the process in a case of transmitting a print job to the image forming apparatus 102 from the external apparatus 101.

At step 701 the control component 101c generates a specific job identifier 104a added at step 702 to be described later and allots it to a print data.

At step 702 the control component 101c adds a job identifier and a transmission start address to the print data to generate a print job.

At step 703 the network communication component 101a transmits the generated print job to the image forming apparatus 102.

At step 704 the control component 101c determines whether or not the transmission of the print job is completed. When it is completed, the process ends. When it is not completed, the process goes to step 705.

At step 705 the control component 101c determines whether or not the network communication component 101a detects the network disruption. When it is detected, the process goes to step 706. When it is not detected, the process goes back to step 703.

At step 706 the control component 101c waits until reconnection of the network in the network communication component 101a is made, that is, until the transmission to the image forming apparatus is recovered. When the recovery of the transmission is confirmed, the process goes back to step 703. At step 703 the print job of which the transmission is not completed due to the network disruption is again transmitted.

Figure 3:
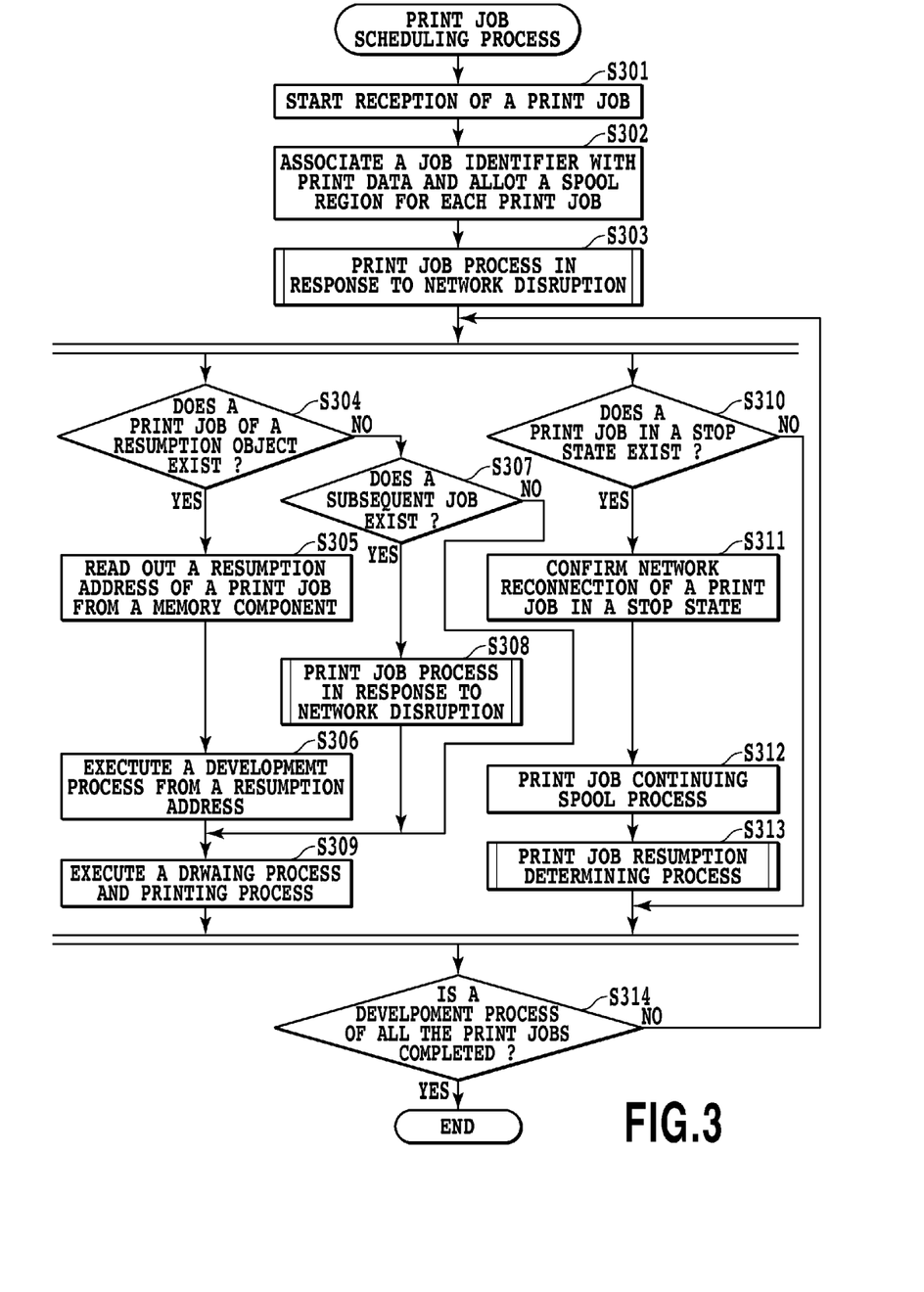
FIG. 3 is a flow chart showing an example of a print job scheduling process.

FIG. 3 is a flow chart showing an example of a print job scheduling process in the image forming apparatus 102 according to the present embodiment.

At step 301 the network communication component 102a starts reception of a print job via various types of interfaces such as wireless LAN, wired LAN, or further USB. In the reception of the print job, the job session information 104a is firstly received. At a stage of receiving the job session information 104a, the process goes to step 302.

At step 302, the control component 102c analyzes the received job session information to extract a job identifier and associates the extracted job identifier with the print job to allot a partial region of the memory component 102b as a spool region for each print job. When the allotment is completed, the process goes to step 303.

At step 303, the print job process in response to the session disconnection due to the network disruption is executed.
(Print Job Process)

Figure 4:
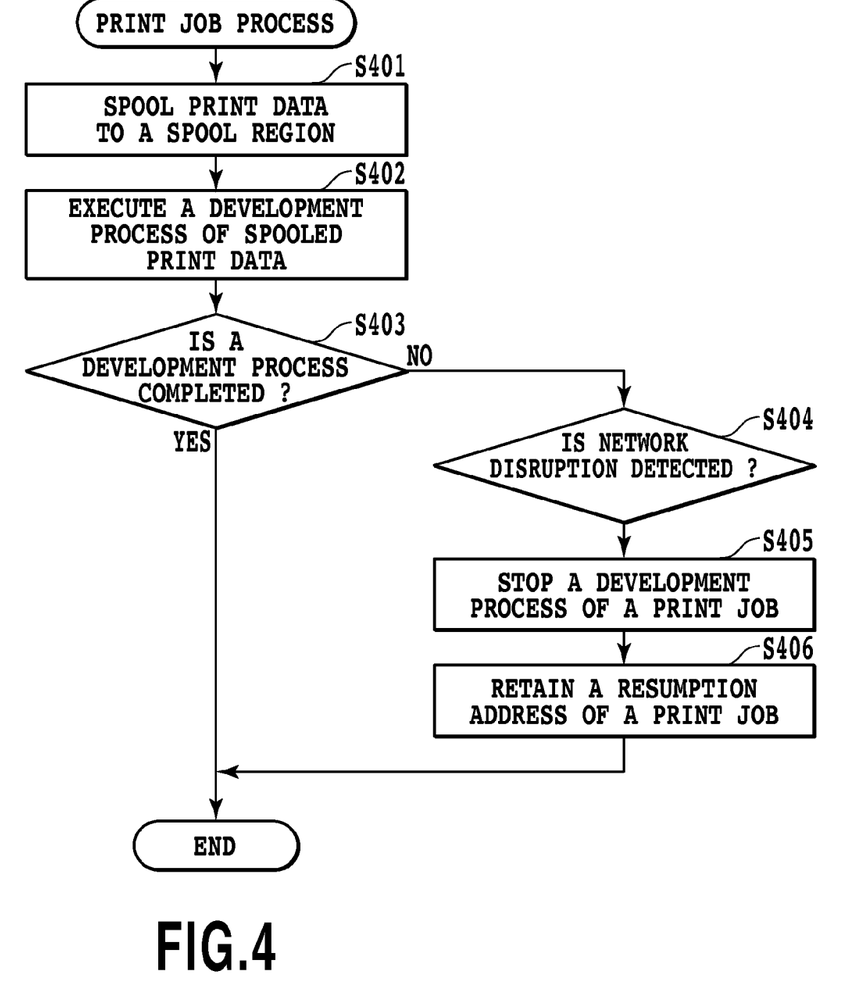
FIG. 4 is a flow chart showing a detail of a print job process.

FIG. 4 is a flow chart showing a detail of the print job process at step 303. It should be noted that this process is executed also at step 309 to be described later.

At step 401 the control component 102c spools the print data to the allotted spool region. When the spool is started, the process goes to step 402.

At step 402 the development component 102d executes the development process in order from the print data of the spooled portion. That is, when the spool process is started, the development component 102d starts the process of developing the spooled PDL data to printable image data (raster data) without waiting for completion of the spooling of all the print data.

At step 403 the control component 102c determines whether or not the development process is completed (whether or not all the PDL data of the print job are developed to the raster data). When the development process is all completed, the process ends. When it is not completed, the process goes to step 404.

At step 404 the control component 102c determines whether or not the session disconnection due to the network disruption is detected in the network communication component 102a. When there occurs an event that the network communication component 102a can not receive a given data within a predetermined time due to some reason in the middle of receiving the print job from the external apparatus (for example, a spool amount does not increase within a given time), the network communication component 102a determines occurrence of the network disruption for detection. It should be noted that in this case, "in the middle of receiving the print job" means a state in the middle of spooling the print data and developing the PDL data.

In a case of detecting the network disruption, the process goes to step 405. When it is not detected, since the session is not disconnected and reception of the print job (continuation of the spool) is possible, the process goes back to step 401.

At step 405, since it is not possible to continue execution of the development process due to the session disconnection by the network disruption, the development component 102d stops the development process of the print job, that is, sets the print job to a stop state, and the process goes to step 406.

At step 406, the control component 102c, for resuming the development process of the print job which has been in the stop state when the spool is completed by the network reconnection, retains a resumption address of the print job in the memory component 102b.

The process is back to the explanation of the flow chart of FIG. 3.

When at step 303 the process of the print job in response to the network disruption is completed, next the processes from step 304 to step 309 and the processes from step 310 to step 313 are executed in parallel.

First, at step 310 the control component 102c determines whether or not the resumption address exists in the memory component 102b (whether or not the print job in the stop state exists). When it exists, the process goes to step 311.

At step 311, the network communication component 102a waits until the network of the print job in the stop state is reconnected and the session is recovered. Further, when the network reconnection is confirmed, the process goes to step 312.

At step 312 the control component 102c executes a print job continuing spool process for spooling the remaining print data of the print job in the stop state.
(Print Job Continuing Spool Process)

Figure 5:
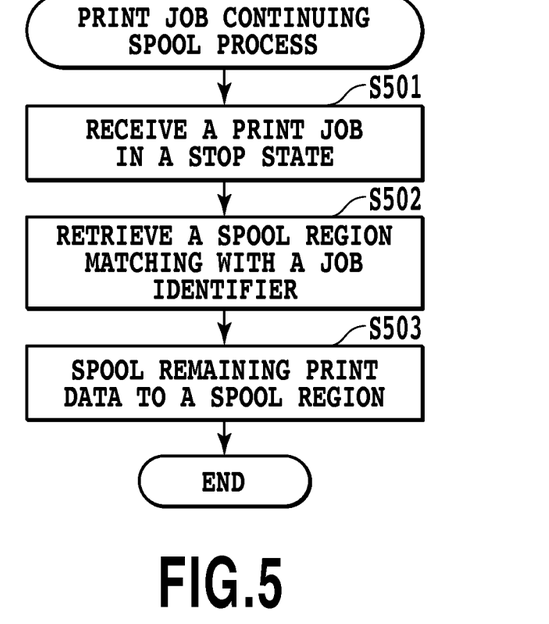
FIG. 5 is a flow chart showing a detail of a print job continuing spool process.

FIG. 5 is a flow chart showing a detail of a print job continuing spool process.

At step 501, the network communication component 102a starts reception of the print job in the stop state. When the network communication component 102a receives the job session information 104a, the process goes to step 502.

Next, at step 502, the control component 102c retrieves a spool region (spool region allotted at step 302 of FIG. 3) matching with a job identifier in the job session information 104a.

In addition, at step 503, the control component 102c spools the remaining print data which are not yet spooled to the spool region acquired by the retrieval.

The process is back to the explanation of the flow chart in FIG. 3.

At step 313, the control component 102c executes the resumption determining process of the print job.
(Resumption Determining Process)

Figure 6:
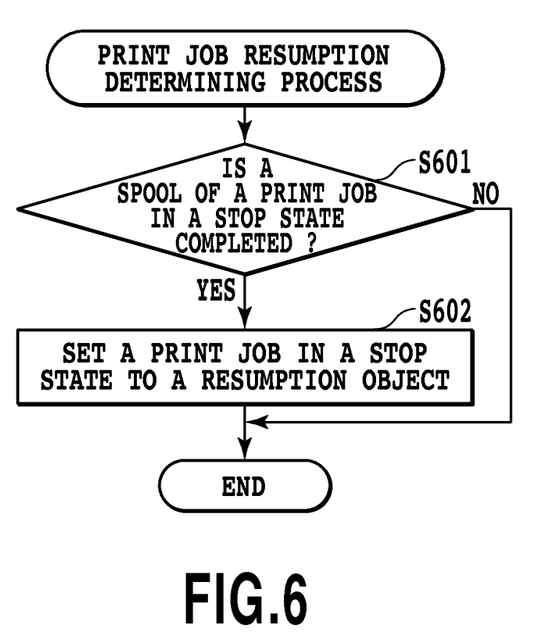
FIG. 6 is a flow chart showing a detail of a resumption determining process of a print job.

FIG. 6 is a flow chart showing a detail of the resumption determining process of the print job.

At step 601, the control component 102c determines whether or not the spool of the remaining print data in the print job which has been in the stop state is completed. When it is determined that it is completed, the process goes to step 602.

At step 602, the control component 102c releases the stop state of the print job which has been in the stop state. Specially the spool of the print job in the stop state is completed, causing no risk that the development process is interrupted due to the session disconnection by the network disruption and therefore the print job which has been in the stop state is set as a resumption object of the development process.

When at step 601, it is determined that the spool is not completed, this resumption determining process ends. As a result, the print job in the stop state is maintained in the stop state as it is.

As described above, each process from step 310 to step 313 is executed.

The process is back to the explanation of the flow chart in FIG. 3.

On the other hand, at step 304 the control component 102c determines whether or not the print job set as the resumption object exists in the memory component 102b. When it exists, the process goes to step 305 for processing the set print job in preference to the other subsequent print job. When it does not exist, the process goes to step 308.

At step 305 the control component 102c reads out the resumption address of the print job from the memory component 102b.

Subsequently, at step 306 the development component 102d executes the development process to the print data of the resumption object in which the spool is completed, from the read resumption address and generates printable raster data.

In addition, at step 309 the image forming component 102e executes a drawing process and/or a printing process to the generated raster data.

On the other hand, at step 307 the control component 102c determines whether or not the subsequent print job exists. When it is determined that it exists, the process goes to step 308. When it does not exist, the process goes to step 309.

At step 308, the print job process which is the same as at step 303 as described above is executed, and thereafter, the process goes to step 309.

At step 309 the image forming component 102e executes the drawing process and/or the printing process to the generated raster data.

As described above, each process from step 304 to step 309 is executed.

At step 314 the control component 102c determines whether or not the development process of all the print jobs is completed. When the development process is all not completed, the process goes back to step 310 and step 304. When it is all completed, the process ends.

As described above, according to the printing system of the present embodiment, occurrence of the wasteful automatic promotion is restricted, making it possible to prevent deterioration in performance of the image forming apparatus.

Second Embodiment

According to the first embodiment, the print job in which the session disconnection due to the network disruption occurs in the middle of receiving the print job is not set as the resumption object of the development process unless the spool is completed. However, in a case where the input of the print job is performed by a device with high reliability such as a wired network, the possibility that the network disruption frequently occurs is low (for example, in a case where an event that a LAN cable is in error pulled is the cause of the network disruption). Accordingly, as to the event that the disruption and reconnection of the network are intermittently repeated as in the case of a wireless network, it may be considered that such an event does not occur in the case of a wired network. Accordingly, in the second embodiment, the event of switching the process depending on either a wired or wireless network will be explained. Here, it is technically difficult to check whether a wired network or a wireless network is used in regard to all the routes of networks between the external apparatus and the image forming apparatus. Therefore, in the present embodiment, it is checked whether or not the external apparatus uses a wireless interface upon inputting a print job and whether or not the image forming apparatus uses a wireless interface at the receiving thereof.

Figure 10:
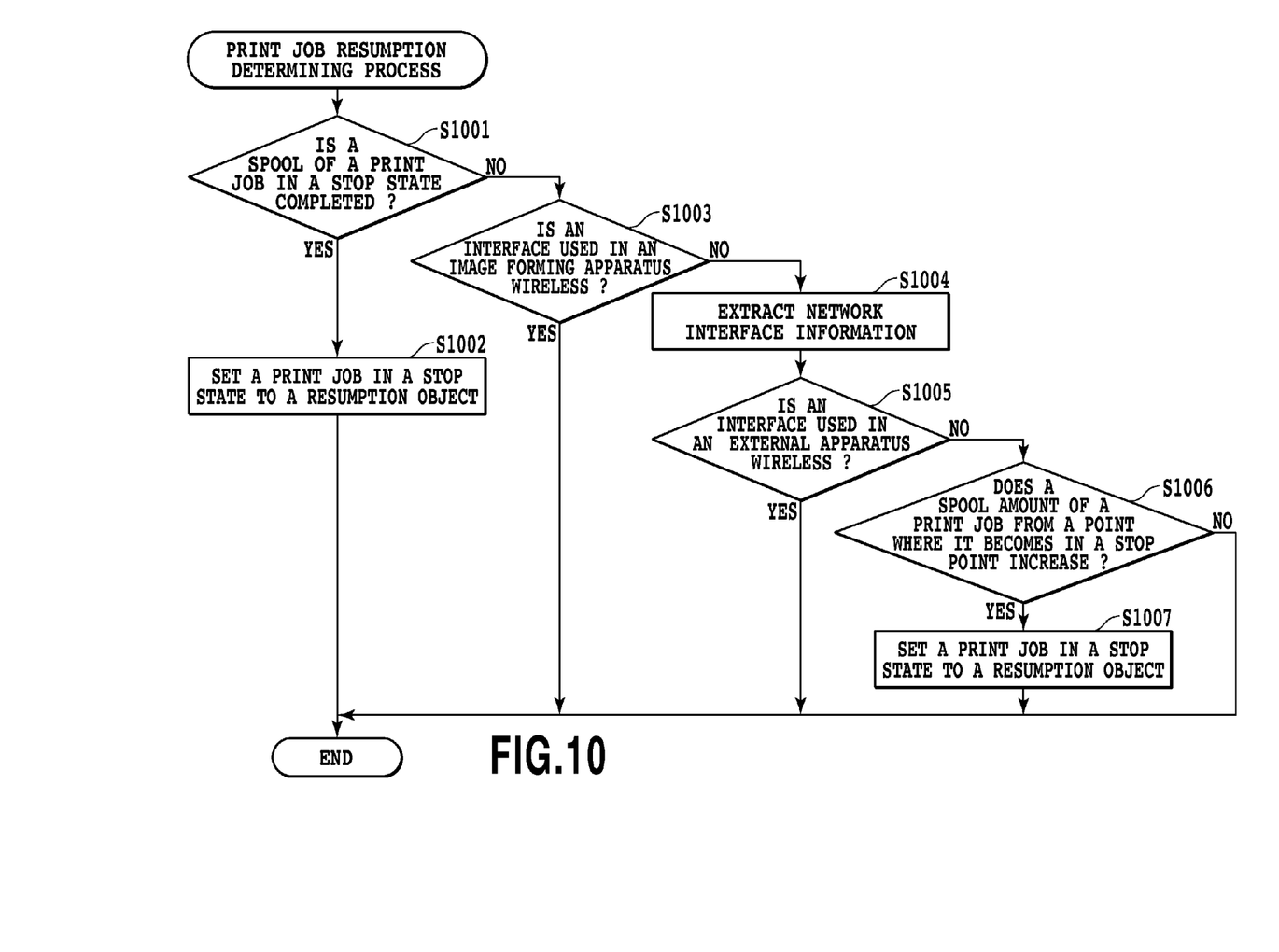
FIG. 10 is a flow chart showing an example of a resumption determining process of a print job.

It should be noted that in the present embodiment, except for use of a flow chart in FIG. 10 in place of FIG. 6 as the process of step 313 in FIG. 3, the processes in common with the first embodiment are executed. An explanation of the portion in common is omitted.

FIG. 10 is a flow chart showing an example of a print job resumption determining process in the image forming apparatus of the present embodiment.

At step 1001, the control component 102c determines whether or not the spool of the print job which has been in the stop state is completed. When it is completed, the process goes to step 1102. When it is not completed, the process goes to step 1003.

At step 1002, the control component 102c releases the stop state of the print job. That is, the spool of the print job in the stop state is completed, causing no risk that the development process is interrupted due to the session disconnection by the network disruption, and therefore the print job is set as a resumption object of the development process to end the process.

At step 1003 the control component 102c determines whether or not an interface used in the network communication component 102a of the image forming apparatus is a wireless interface. Specially the control component 102c extracts network interface information containing information showing whether the network interface used in the external apparatus is a wireless or wired interface, from the job session information 104 in the print job and analyzes this network interface information for the determination. When the determination result is that the interface is a wireless one, it is assumed that a risk that the network disruption frequently occurs is high and the process ends. That is, as long as the spool is not completed, the stop state of the print job is not released and the print job continues to be retained in the stop state.

At step 1003, when it is determined that it is not the wireless, the process goes to step 1004.

At step 1004 the control component 102c analyzes the job session information to extract the network interface information. After extracted, the process goes to step 1005.

At step 1005 the control component 102c determines whether or not the network interface used in the external apparatus is a wireless interface from the extracted network interface information. In a case of the wireless network interface, the process ends similarly to a case where it is determined at step 1003 that the network interface is the wireless interface.

When at step 1005 it is determined that the network interface is not the wireless, the process goes to step 1006.

At step 1006 the control component 102c determines whether or not the spooled data amount increases from a point (stop point) of setting the print job to the stop state. When the spooled data amount increases, the process goes to step 1007.

When the spooled data amount does not increase, it is assumed that the communication is interrupted by some cause such as pulling-out of a cable connector or disruption of a cable, and the process ends. In this case, the print job does not become a resumption object and continues to be retained in the stop state.

At step 1007 the control component 102*c* determines that at least the wireless is not used at the time of inputting a print job in the external apparatus and receiving a print job in the image forming apparatus and a risk that the network disruption frequently occurs is low. Therefore, the stop state of the print job is released. That is, the print job in the stop state is set as a resumption object of the development process even if the spool is not completed, and the process ends.

Figure 11:
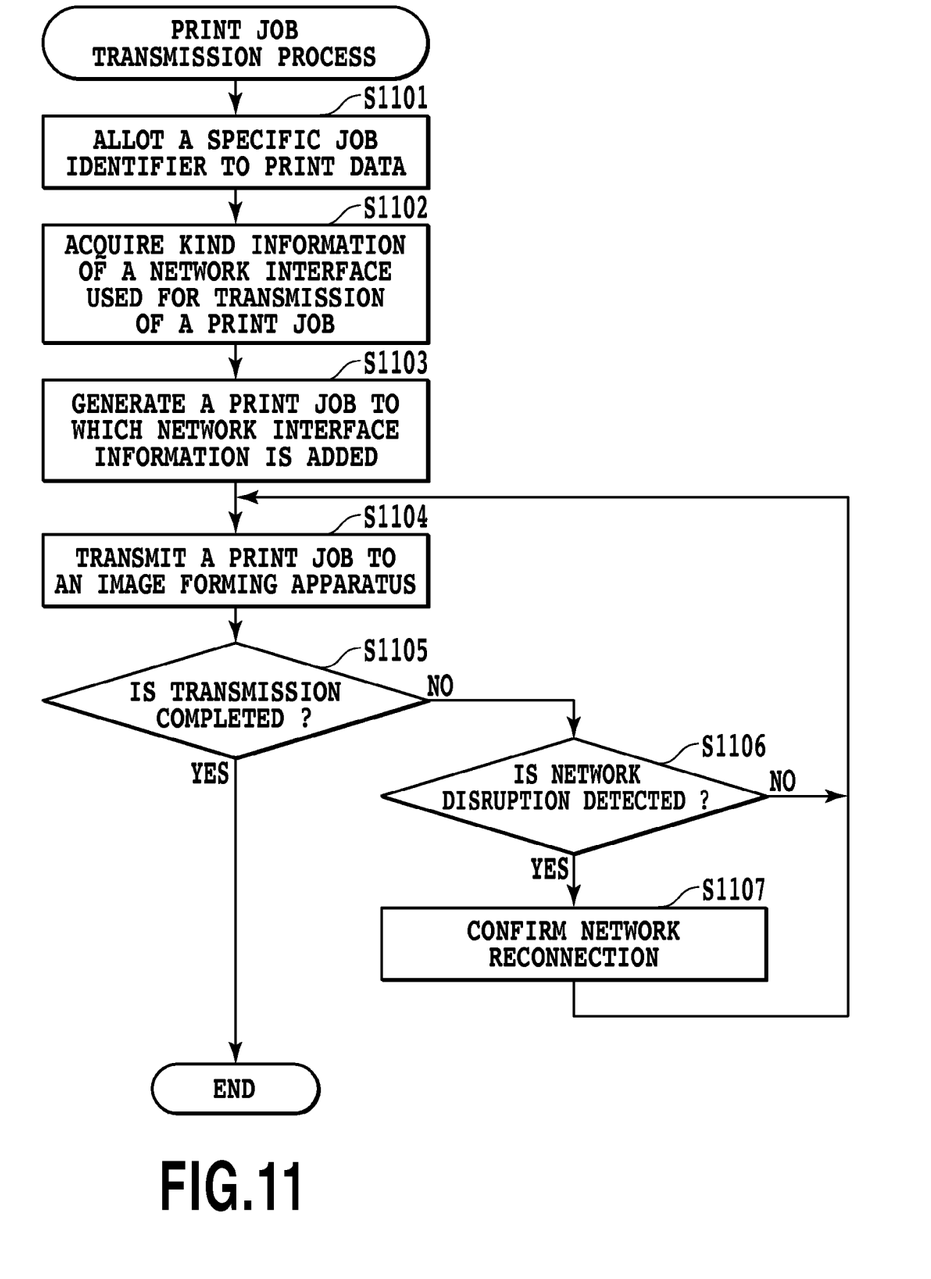
FIG. 11 is a flow chart showing an example of a transmission process of a print job.

FIG. 11 is a flow chart showing an example print job transmission process in the external apparatus 101 according to the present embodiment.

At step 1101 the control component 101*c* allots a specific job identifier to the print data, and the process goes to step 1102.

At step 1102 the control component 101*c* acquires kind information of a network interface which the network communication component 101*a* uses at the time of transmitting a print job, and the process goes to step 1103.

At step 1103 the control component 101*c* generates a print job to which the job identifier, the transmission start address and the kind information of the acquired network interface (network interface information) are added, and the process goes to step 1104.

At step 1104 the network communication component 101*a* transmits the generated print job to the image forming apparatus.

At step 1105 the network communication component 101*a* determines whether or not the transmission is completed. When it is completed, the process ends. When it is not completed, the process goes to step 1106.

At step 1106 the network communication component 101*a* determines whether or not the network disruption is detected. When it is detected, the process goes to step 1107. When it is not detected, the process goes back to step 1104. At step 1104 the print job is again transmitted.

At step 1107 the network communication component 101*a* waits for reconnection of the network, and the process goes back to step 1104 after confirming that the communication is recovered.

According to the present embodiment, in a case where a risk that the network disruption in the input route of the print job frequently occurs is low, the stop state of the print job can be released without waiting for completion of the spool, thereby resuming the development process to the printing process. Therefore, in regard to the print job in a case where the risk of the network disruption is low, the print job is outputted without being passed by the subsequent print job at occurrence of the job promotion.

Third Embodiment

In the present embodiment, when the image forming apparatus performs the job promotion, a output tray (delivery tray) of the print job made to the stop state can not be temporarily used in the subsequent print job. In the subsequent print job, the process (drawing process) of the print job in which the printing process is not executed is prioritized as long as the output-possible output tray does not exist. Hereinafter, a detail of the present embodiment will be explained.

Figure 12:
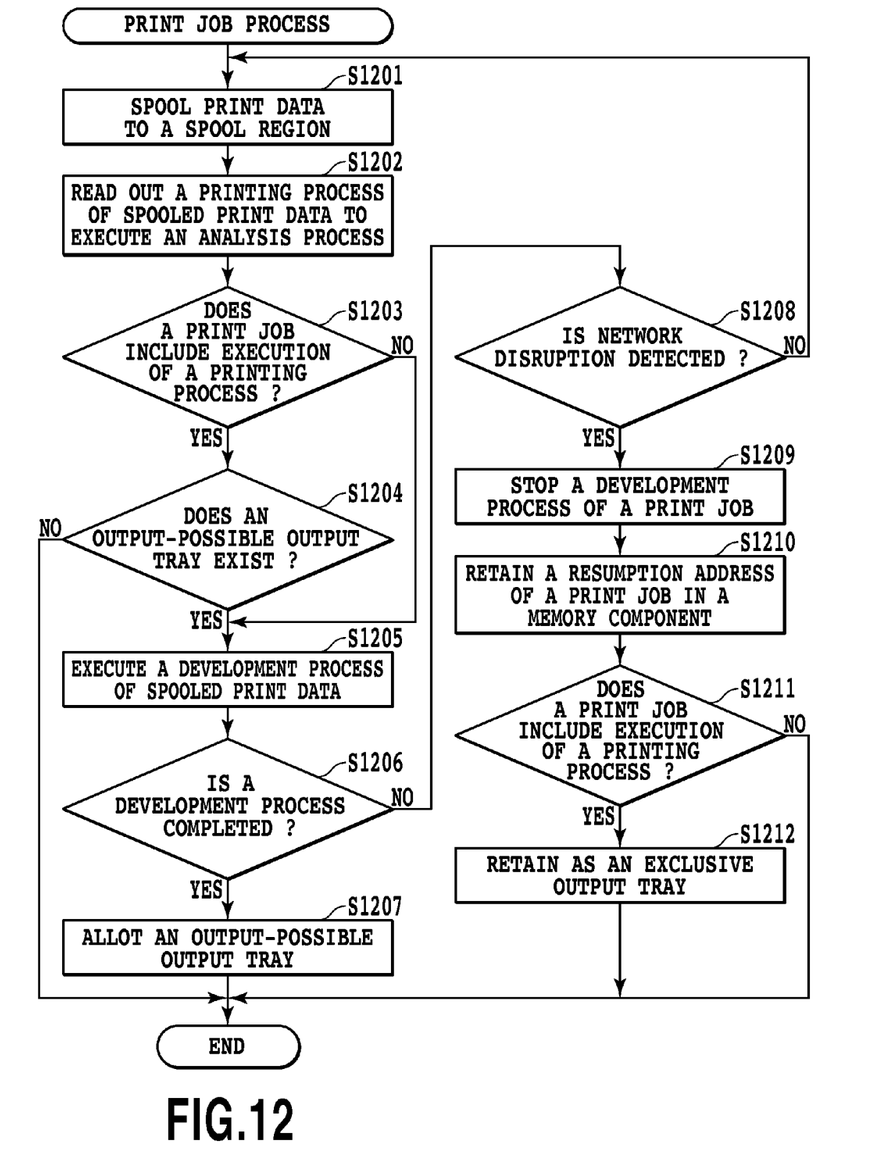
FIG. 12 is a flow chart showing an example of a print job process.

It should be noted that in the present embodiment, except for use of a flow chart in FIG. 12 in place of FIG. 4 as the processes of step 303 and step 308 in FIG. 3, the processes in common with the first embodiment are executed. An explanation of the portion in common is omitted.

FIG. 12 is a flow chart showing an example of a print job process in the present embodiment.

At step 1201 the control component 102*c* spools print data to a spool region.

At step 1202 the control component 102*c* reads out and analyzes a print setting of the spooled print data to confirm whether or not the printing process is executed (whether or not the drawing process is executed without executing the printing process).

At step 1203 the control component 102*c* determines whether or not the print job includes also execution of the printing process based upon the analyzed result. In a case where it includes also the execution of the printing process, the process goes to step 1204. In a case where it does not include the execution of the printing process, the process goes to step 1205.

At step 1204 the control component 102*c* determines whether or not another output-possible output tray exists. Specially at step 1212 to be described later, the control component 102*c* determines whether or not a usable output tray exists without setting a output tray exclusive for a specific print job. When the usable output tray exists, the process goes to step 1205, and when it does not exist, the process ends.

At step 1205 the development component 102*d* executes the development process to the spooled print data.

At step 1206 the control component 102*c* determines whether or not the development process is completed. When it is completed, the process goes to step 1207. When it is not completed, the process goes to step 1208.

At step 1207, in a case where the print job of the process object includes execution of the printing process, the control component 102*c* allots an output-possible output tray to end the process. In a case where it is the print job for the drawing process, the process ends as it is.

At step 1208 the control component 102*c* determines whether or not the network communication component 102*a* detects the network disruption. When it detects the network disruption, the process goes to step 1209. When it does not detect the network disruption, since the following data communication is possible, the process goes back to step 1201.

At step 1209, since the development component 102*d* can not continue to execute the development process due to the network disruption, it stops the development process of the print job (sets the print job to be in a stop state), and the process goes to step 1210.

At step 1201 the control component 102*c* retains a resumption address of the print job in the memory component 102*b* since the development process restarts with the following print job when the network is reconnected.

At step 1211 the control component 102*c* determines whether or not the print job includes also execution of the printing process, based upon the analysis result at step 1202. When it includes also the execution of the printing process, the process goes to step 1212, and if not, the process ends.

At step 1212 the control component 102*c* temporarily sets a output tray used in the print job to a output tray exclusive for the print job, such that the output tray can not be used at subsequent other print jobs, and the process ends.

According to the present embodiment, the output tray used by the print job in the stop state is secured as the exclusive output tray until the output process of the print job in the stop state is completed. Therefore, in regard to the subsequent print jobs, the process (drawing process) of the print job to which the printing process is not executed is prioritized as long as the output-possible other output tray does not exist. As a result, the printing process of the precedent print job can be prioritized for execution.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-99046, filed Apr. 15, 2009, which is hereby incorporated by reference herein in its entirety.

What is claimed is:

1. An image forming apparatus to which an external apparatus equipped with a transmission unit for transmitting a print job is connected via a network, the image forming apparatus comprising:
   a reception unit configured to receive the print job from the external apparatus;
   a spooling unit configured to spool the received print job;
   a development unit configured to develop the spooled print job to a printable data;
   a detecting unit configured to detect network disruption in the network;
   a control unit configured to, in a case of detecting the network disruption in the middle of spooling and developing the received print job by the spooling unit and the development unit, stop the development of the print job for a stop state and set a subsequent print job which is not in the stop state as an object of the development; and
   a determining unit configured to determine whether or not the reception unit and the transmission unit of the external apparatus each use a wireless interface,
   wherein the spooling unit resumes the spooling of the print job when the network of the print job in the stop state is reconnected, and
   wherein the control unit releases the stop state of the print job when the spooling of the print job in the stop state is completed and releases the stop state of the print job even if the spooling of the print job in the stop state is not completed in a case where the determining unit determines that the reception unit and the transmission unit of the external apparatus each do not use the wireless interface.

2. An image forming apparatus according to claim 1, further comprising:
   a determination unit configured to determine whether or not a spool amount of the print job in the stop state increases from a stop point,
   wherein the control unit releases the stop state of the print job in the case where the spool amount of the print job in the stop state increases from the stop point as a result of the determination by the determination unit.

3. An image forming apparatus according to claim 1, wherein the print job includes information of a print setting containing at least information of a process content and an output tray for use, the apparatus further comprising:
   an analyzing unit configured to analyze the print setting of the received print job for confirming whether or not the printing process is executed and an output tray used in the print job; and
   a second determining unit configured to, in a case where the print job is a job for the printing process, determine whether or not an output-possible output tray exists,
   wherein the control unit is, in a case where the print job in the stop state is the job for the printing process, configured such that the output tray used in the print job cannot be used in another print job until the stop state of the print job is released, and in a case where the second determining unit determines that the output-possible output tray does not exist, configured to give priority to a print job to which the printing process is not executed among other print jobs which are not in the stop state for an object of development.

4. A method of controlling an image forming apparatus to which an external apparatus equipped with a transmission unit for transmitting a print job is connected via a network, the method comprising the steps of:
   receiving, by a reception unit, the print job from the external apparatus;
   spooling the received print job;
   developing the spooled print job to a printable data;
   detecting network disruption in the network;
   controlling to, in a case of detecting the network disruption in the middle of spooling and developing the received print job, stop the development of the print job for a stop state and setting a subsequent print job which is not in the stop state as an object of the development; and
   determining whether or not the reception unit and the transmission unit of the external apparatus each use a wireless interface,
   wherein the spooling step resumes the spooling of the print job when the network of the print job in the stop state is reconnected, and
   wherein the control step releases the stop state of the print job when the spool of the print job in the stop state is completed and releases the stop state of the print job even if the spooling of the print job in the stop state is not completed in a case where the determining step determines that the reception unit and the transmission unit of the external apparatus each do not use the wireless interface.

5. A non-transitory computer-readable recording medium storing computer executable code of a program for causing a computer to perform a method of controlling an image forming apparatus to which an external apparatus equipped with a transmission unit for transmitting a print job is connected via a network, the program comprising:
   code for receiving, by a reception unit of the image forming apparatus, the print job from the external apparatus;
   code for spooling the received print job;
   code for developing the spooled print job to a printable data;
   code for detecting network disruption in the network;
   code for controlling to, in a case of detecting the network disruption in the middle of spooling and developing the received print job, stop the development of the print job for a stop state and setting a subsequent print job which is not in the stop state as an object of the development; and code for determining whether or not the reception unit and the transmission unit of the external apparatus each use a wireless interface, wherein the spooling step resumes the spooling of the print job when the network of the print job in the stop state is reconnected, and wherein the control step releases the stop state of the print job when the spooling of the print job in the stop state is completed and releases the stop state of the print job even if the spooling of the print job in the stop state is not completed in a case where it is determined that reception unit and the transmission unit of the external apparatus each do not use the wireless interface.

* * * * *